United States Patent
Pogorelik et al.

(10) Patent No.: US 11,781,890 B2
(45) Date of Patent: Oct. 10, 2023

(54) METHOD, A CIRCUIT AND A SYSTEM FOR ENVIRONMENTAL SENSING

(71) Applicant: Intel Corporation, Santa Clara, CA (US)

(72) Inventors: Oleg Pogorelik, Lapid (IL); Omer Ben-Shalom, Rishon le-Tzion (IL); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 645 days.

(21) Appl. No.: 15/857,667

(22) Filed: Dec. 29, 2017

(65) Prior Publication Data

US 2019/0049275 A1 Feb. 14, 2019

(51) Int. Cl.
| | | |
|---|---|---|
| *G01D 18/00* | (2006.01) | |
| *G05D 1/02* | (2020.01) | |
| *B64C 39/02* | (2023.01) | |
| *G05D 1/08* | (2006.01) | |
| *B64U 101/35* | (2023.01) | |

(52) U.S. Cl.
CPC ............ *G01D 18/00* (2013.01); *B64C 39/024* (2013.01); *G05D 1/0202* (2013.01); *B64U 2101/35* (2023.01); *B64U 2201/10* (2023.01); *G05D 1/0808* (2013.01)

(58) Field of Classification Search
CPC .................. G01D 18/00; B64C 39/024; B64C 2201/125; G05D 1/0202
USPC .......................................... 202/183; 702/183
See application file for complete search history.

(56) References Cited

U.S. PATENT DOCUMENTS

| | | | |
|---|---|---|---|
| 10,034,067 B1* | 7/2018 | Palmgren, III | E21B 47/008 |
| 2015/0304612 A1* | 10/2015 | Richards | H04N 5/33 348/159 |
| 2016/0035246 A1* | 2/2016 | Curtis | H04L 67/10 340/815.4 |
| 2016/0107749 A1* | 4/2016 | Mucci | G08B 25/001 701/3 |
| 2016/0255058 A1* | 9/2016 | Smith | H04W 12/35 713/150 |
| 2016/0364004 A1* | 12/2016 | Ekandem | G06V 40/28 |
| 2017/0024671 A1* | 1/2017 | McCormack | B64C 39/024 |
| 2017/0078965 A1* | 3/2017 | Chen | H04W 12/041 |
| 2017/0358105 A1* | 12/2017 | Torres | B64D 47/08 |
| 2017/0358201 A1* | 12/2017 | Govers | G08B 29/188 |
| 2018/0072265 A1* | 3/2018 | Samadani | G06F 21/00 |
| 2018/0239991 A1* | 8/2018 | Weller | G06F 16/907 |

(Continued)

*Primary Examiner* — Paul D Lee

(74) *Attorney, Agent, or Firm* — VIERING, JENTSCHURA & PARTNERmbB

(57) ABSTRACT

A circuit includes a first communication interface configured to receive first sensor data from a stationary sensor. The first sensor data include a result of a first sensing of a local environment of the stationary sensor performed by the stationary sensor. The circuit may further include a second communication interface configured to receive second sensor data from an unmanned aerial vehicle. The second sensor data include a result of a second sensing of at least a portion of the local environment of the stationary sensor performed by a sensor of the unmanned aerial vehicle. The circuit may further include one or a plurality of processors configured to compare the first sensor data and the second sensor data and to classify the at least one stationary sensor based on a result of the comparison.

20 Claims, 8 Drawing Sheets

(56) References Cited

U.S. PATENT DOCUMENTS

| | | | |
|---|---|---|---|
| 2019/0055015 A1* | 2/2019 | Allard | G06Q 10/00 |
| 2019/0121782 A1* | 4/2019 | Sun | G06N 20/00 |
| 2019/0188797 A1* | 6/2019 | Przechocki | G06N 20/00 |
| 2019/0273909 A1* | 9/2019 | Ye | G06T 7/579 |
| 2020/0283142 A1* | 9/2020 | Canli | B64C 5/00 |

* cited by examiner

METHOD, A CIRCUIT AND A SYSTEM FOR ENVIRONMENTAL SENSING

TECHNICAL FIELD

Various embodiments relate generally to a method, a circuit and a system.

BACKGROUND

In general, a variety of sensor types is conventionally used for monitoring, controlling, and smart applications or appliances. If a common network is augmented with sensors and actuators, the network becomes an instance of the more general class of cyber-physical systems, which also encompasses technologies such as smart grids, virtual power plants, smart homes, intelligent transportation and smart cities. The cyber-physical system is a mechanism that is controlled or monitored by computer-based algorithms, integrated with the Internet and its users. For example, various sensor types may be connected via the network for controlling various types of physical devices, such as vehicles, home appliances, and other items embedded with electronics, software, other sensors, or actuators.

Conventionally, the more complex the augmented network is, the greater the effort that is needed for its maintenance, and the more it has to rely on the acquisition of information via sensors. However, for each sensor there exists a certain risk that incorrect measurement data may be reported, for example, as caused by connection malfunction, sensor malfunction, corruption, aging of the sensor, and the like. Incorrect measurement data may cause serious consequences, as the network may react in the wrong direction. Therefore, maintenance, diagnostics, calibration, and redundancy are of critical importance in augmented and other complex networks, but generate additional costs.

SUMMARY

A circuit includes a first communication interface configured to receive first sensor data from a stationary sensor. The first sensor data include a result of a first sensing of a local environment of the stationary sensor performed by the stationary sensor. The circuit may further include a second communication interface configured to receive second sensor data from an unmanned aerial vehicle. The second sensor data include a result of a second sensing of at least a portion of the local environment of the stationary sensor performed by a sensor of the unmanned aerial vehicle. The circuit may further include one or a plurality of processors configured to compare the first sensor data and the second sensor data and to classify the at least one stationary sensor based on a result of the comparison.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
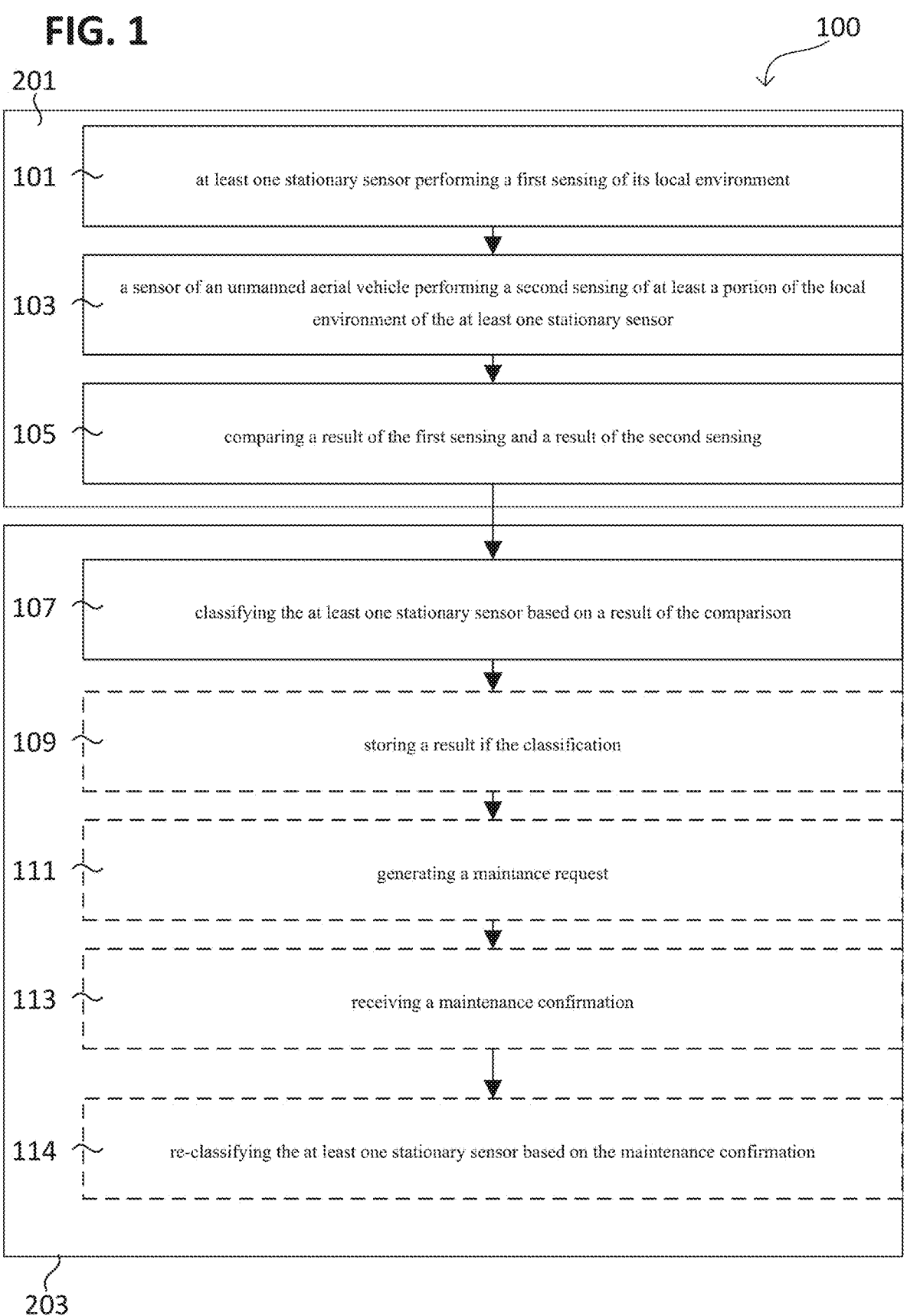
FIGS. 1 and 2 respectively show method in a flow diagram according to various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The terms "at least one" and "one or more" may be understood to include a numerical quantity greater than or equal to one (e.g., one, two, three, four, [. . . ], etc.). The term "a plurality" may be understood to include a numerical quantity greater than or equal to two (e.g., two, three, four, five, [. . . ], etc.).

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, a plurality of a multiple of listed elements, or each of the listed elements. The phrase "at least one of" with regard to a single element may be used herein to mean one individual element or more than one element.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

The term "circuit" may be understood as any kind of a logic implementing entity, which may be special purpose circuitry or a processor executing software stored in a memory, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java.

Any other kind of implementation of the respective functions which will be described in more detail below may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "position" used with regard to a "position of an unmanned aerial vehicle", "position of an object", "position of an obstacle", and the like, may be used herein to mean a point or region in a two- or three-dimensional space. It is understood that suitable coordinate systems with respective reference points are used to describe positions, vectors, movements, and the like.

An unmanned aerial vehicle (UAV) is an aircraft that has the capability of autonomous flight. In autonomous flight, a human pilot is not aboard and in control of the UAV. The UAV may also be denoted as unstaffed, uninhabited or unpiloted aerial vehicle, -aircraft or -aircraft system or drone.

Current large Internet of Things (IoT) based systems such as weather monitoring, radiometry and pollution hazards, are characterized by large number of remote IoT sensors spread over a wide geography. As with any other remote system, such IoT Sensors could malfunction or be compromised by malicious third party resulting in accumulated distortion of data leading to wrong decisions and/or critical system failures.

Conventionally, in highly distributed systems, the problem is solved by running periodic "manual" maintenance procedures. In other words, a technician visits the sensor and inspects/calibrates it in place. Alternatively, sophisticated IoTs may support remote diagnostic tests, adding redundant elements to the IoT circuitry.

Conventional solutions are either expensive (due to manual labor, redundant elements, etc.) and/or unreliable due to the need for reliable remote connection and the inherent trust in a potentially malfunctioning/compromised entity (remote diagnostics). For example, a corrupted (e.g. hacked) sensor may not be detected and replaced in time to avoid unwanted consequences.

According to various embodiments, a swarm of UAVs (e.g. microdrones), may be equipped with precise sensors of various types that will inspect the IoT system sensors in a periodic and/or randomized fashion, measure appropriate parameters in place (e.g., sampling the data) and send them to a central processing system using a dedicated communication channel or collect measurements and deliver them physically to a trusted data collection point.

A central processing unit may be configured to compare the sampled data against the corresponding measurements coming from a specific IoT, thereby allowing for detection of contradictions/anomalies. Sensors classified as "out of order" may be reported for maintenance/replacement and/or be ignored temporarily or permanently.

According to various embodiments, an effective automated assessment of remote IoT sensors is provided, rendering expensive periodic manual testing and calibration procedures as obsolete. The system, circuit and method provide for a low cost solution compared to conventional "manual" procedures, and for detection of a compromised sensor and compromised communication channels.

According to various embodiments, inspection of sensors in hard to reach and/or widely distributed geo locations may be facilitated.

FIG. 1 illustrates a method 100 in a flow diagram according to various embodiments. The method may include in 101 (also referred as to stationary sensing 101) at least one stationary sensor performing a first sensing of its local environment, in 103 (also referred as to onboard sensing 103) a sensor of an UAV (also referred as to mobile sensor or onboard sensor) performing a second sensing of at least a portion of the local environment of the at least one stationary sensor, in 105 comparing a first result of the first sensing (also referred as to stationary result) and a second result of the second sensing (also referred as to onboard result), and in 107 classifying the at least one stationary sensor based on a result of the comparison (also referred as to comparison result).

Sensing, e.g. the stationary sensing 101 and/or the onboard sensing 103, may include evaluating the environmental condition, detecting an event or changes in the environmental condition and provide information thereof, e.g. to other electronics (such as one or more than one processor) and/or via an electrical signal. Sensing may include, for example, sampling the environmental condition and providing a signal with a signal strength that correlates to the environmental condition as evaluated (e.g., as sampled).

Illustratively, the UAV performs a comparison measurement at the sensors, which is used for identifying divergences, malfunctioning, or expressed more general, to determine the reliability of the sensor. For example, if the stationary sensing 101 and the onboard sensing 103 reveal the substantially same result, the sensor provides a high reliability. The more the stationary result and the onboard result differ from each other, the less reliability is provided by the sensor. At a certain lack of reliability, the sensor may be reported and/or scheduled for maintenance, e.g., to be inspected, calibrated, replaced, repaired, or otherwise adapted.

The at least one stationary sensor 204 may be configured to may comply with an internet of things system (IoT system) as described in detail later. The system, e.g. a local server or other central processing unit thereof, compares the stationary result and the onboard result, for example, in an automated manner. Exemplarily, an autonomous system for validation and calibration of one or more IoT sensors is provided according to various embodiments.

The stationary sensing 101, the onboard sensing 103 and the comparison 105 may be part of an inspection routine 201. Optional, the inspection routine 201 may be performed repeatedly and/or autonomously, e.g., periodically, based on a priority of inspection of the at least one stationary sensor 204 and/or based on a maintenance confirmation of the at least one stationary sensor 204.

The classification 107 may be part of a handling routine 203. The handling routine 203 may optionally further include in 109 storing a result of the classification 107 (e.g. in a database), in 111 generating (e.g., and sending) a maintenance request based on the result of the classification (also referred as to classification result), in 113 receiving a maintenance confirmation, and in 116 re-classifying the at least one stationary sensor in response to receiving the maintenance confirmation, e.g. based on the maintenance confirmation and/or based on the result of a further inspection routine 201.

Generally, the stationary sensing 101 and the onboard sensing 103 may be performed in chronological and/or spatial proximity to each other. Due to geometric and other limitations, the stationary sensing 101 and the onboard sensing 103 may be distanced chronologically and/or spatially (also referred as to sensing distance) from each other. In other words, the sensing distance refers to a (chronological and/or spatial) distance between the stationary sensing 101 and the onboard sensing 103. The chronological and/or spatial proximity may be configured such that the stationary result and onboard result are comparable, for example, (e.g., causal) correlated, with each other.

For example, the chronological and/or spatial proximity may consider the type of environmental condition to be sensed, e.g. by considering its typical (e.g. inherent) changing rate and/or time scale of changes. Illustratively, wind speed may almost randomly vary within a timeframe of several seconds, therefore rendering two measurements chronologically separated by several seconds to be incomparable. On the other hand, air and/or water temperature may change slowly over a timeframe of several hours, whereby two measurements chronologically separated even by several seconds may be comparable.

For example, the stationary sensing 101 and the onboard sensing 103 may be configured relative to each other, such that the actual environmental condition (true environmental condition) to be sensed differs at the sensing distance less than about 20%, e.g. less than about 10%, e.g. less than about 5%, e.g. less than about 2%, e.g. less than about 1%, e.g. less than about 0.1%.

Additionally or alternatively, the chronological and spatial proximity may be configured in view of the inherent measurement error (e.g. composed by a random error and a systematic error) of the at least one stationary sensor and/or the onboard sensor. Illustratively, a stationary anemometer may provide a more accurate measurement of the wind speed than an onboard anemometer, e.g. due to wind-triggered fluctuations by the UAV itself.

The measurement error is understood as difference between a measured value of a quantity and its true value. In statistics, an error is not understood as a "mistake." Variability is an inherent part of the results of measurements and of the measurement process. Therefore, each sensor is limited in its accuracy, which is defined by the systematic error. Random errors lead to measurable values being inconsistent when repeated measurements of a constant attribute or quantity are taken. A systematic error is not determined by chance but is introduced by an inaccuracy (involving either the observation or measurement process) inherent to the sensor itself. Systematic error may also refer to an error with a nonzero mean, the effect of which is not reduced when observations are averaged.

For example, the stationary sensing 101 and the onboard sensing 103 may be configured relative to each other, such that the actual environmental differs at the sensing distance less than about 500% of the measurement error, e.g. less than about 250% of the measurement error, e.g. less than about 100% of the measurement error.

Optionally the sensing distance may be minimized as much as possible. Illustratively, a stationary sensing 101 that is performed hourly requires, for example, to chronologically align the UAV approaching the at least one stationary sensor right in time and/or waiting with the onboard sensing 103 until the stationary sensing 101 is performed again. On the other hand, a high-speed stationary sensor may sense thousands of times within one second, which facilitates synchronizing the stationary sensing 101 and onboard sensing 103. In another case, a stationary sensor disposed in a cave may be hard to reach by the UAV. On the other hand, a stationary sensor on a roof or pylon may be accessed easily.

For example, a chronological sensing difference may be less than about 1 minute, e.g. less than about 0.3 minutes, e.g. less than about 0.1 minutes, e.g. less than about 1 second, e.g. less than about 0.3 seconds, e.g. less than about 0.1 seconds, e.g. less than about 10 milliseconds. Additionally or alternatively, a spatial sensing difference may be less than about 50 meters, e.g. less than about 10 meters, e.g. less than about 5 meters, e.g. less than about 1 meter, e.g. less than about 0.5 meters, e.g. less than about 0.1 meters.

Additionally or alternatively to the minimizing of the sensing difference, the comparison 105 may consider (e.g., may be based on) the sensing difference. Illustratively, a greater difference between the results of the stationary sensing 101 and the onboard sensing 103 may be tolerable, if the sensing difference is noticeably high (but, e.g., not further reducible). For example, a criterion (e.g. threshold) used in the comparison 105 may be based on the sensing difference, e.g., the chronological and/or spatial divergence between the stationary sensing 101 and the onboard sensing 103. Additionally or alternatively, a criterion (e.g. threshold) used in the comparison 105 may be based on a first context information (e.g., a time stamp and/or geotag) of the stationary sensing 101 and a second context information (e.g., a time stamp and/or geotag) of the onboard sensing 103. The geotag may be understood as geographical identification metadata. The geotag may include or be formed from latitude and longitude coordinates, though it optionally may include altitude, bearing, distance, accuracy data, and place names and/or a time stamp.

According to various embodiments, the at least one stationary sensor and the onboard sensor may be of the same sensor type. Additionally or alternatively, the at least one stationary sensor and/or the onboard sensor may include or be formed from one sensor of the following sensor types: a temperature sensor, a radiation sensor (e.g. electromagnetic sensor, particle sensor or other radio sensor), a humidity sensor (e.g. steam sensor), a luminance sensor, a wind speed sensor (also referred as to anemometer), a pollution (e.g. air pollution and/or water pollution) sensor; a chemical composition sensor (also referred as to chemical sensor); a pressure sensor; an electricity sensor (e.g. current sensor, power sensor and/or voltage sensor); a bionic sensor (also referred as to Biosensor); an audio sensor (e.g. a microphone); an image sensor and/or a video sensor (e.g. a camera). Also other sensor types may be used if appropriate, e.g. an proximity sensor, a photoelectric sensor, microelectromechanical sensor, a flow sensor, a force sensor, an acoustic sensor, a vibration sensor, seismometer, a gas sensor, a hall effect sensor, a gyroscope and/or an acceleration sensor (also referred as to accelerometer).

A temperature sensor may provide information about the temperature of its environment (also referred as to temperature information). A radiation sensor may provide information about the radiation of its environment (also referred as to radiation information). A humidity sensor may provide information about the humidity of its environment (also referred as to humidity information). A luminance sensor may provide information about the luminance of its environment (also referred as to luminance information). An anemometer may provide information about the wind speed of its environment (also referred as to wind speed information). A pollution sensor may provide information about the (e.g. air and/or water) pollution of its environment (also referred as to pollution information). A chemical sensor may provide information about the chemical composition of its environment (also referred as to chemical composition information). A pressure sensor may provide information about the pressure of its environment (also referred as to pressure information). An electricity sensor may provide information about the electricity of its environment (also referred as to electricity information), e.g., about current and/or voltage. An audio sensor may provide information about sound in its environment (also referred as to audio information). An image sensor may provide one or more images of its environment (also referred as to image information). A video sensor may provide information about objects (e.g. identification thereof) in its environment (also referred as to video information). A bionic sensor may provide information about one or more biological components in its environment (also referred as to bionic information).

In other words, the stationary sensing 101 and the onboard sensing 103 may provide at least one environmental information type of the following environmental information types: temperature information, radiation (e.g. electromagnetic, particle and/or radio) information, humidity information, luminance information, wind speed information, (air and/or water) pollution information; chemical composition information; pressure information; bionic information; electricity information; audio information; image information and/or video information.

According to various embodiments, the UAV may include at least one sensor, e.g. two or more (e.g. three, four, five, six, seven, eight, nine, ten or more than tan) sensors differing in their sensor type, e.g. at least two sensors differing in their sensor type, e.g. at least three sensors differing in their sensor type. Additionally or alternatively, the at least one stationary sensor may include at least one sensor, e.g. two or more (e.g. three, four, five, six, seven, eight, nine, ten or more than ten) sensors differing in their sensor type, e.g. at least two sensors differing in their sensor type, e.g. at least three sensors differing in their sensor type.

Figure 2:
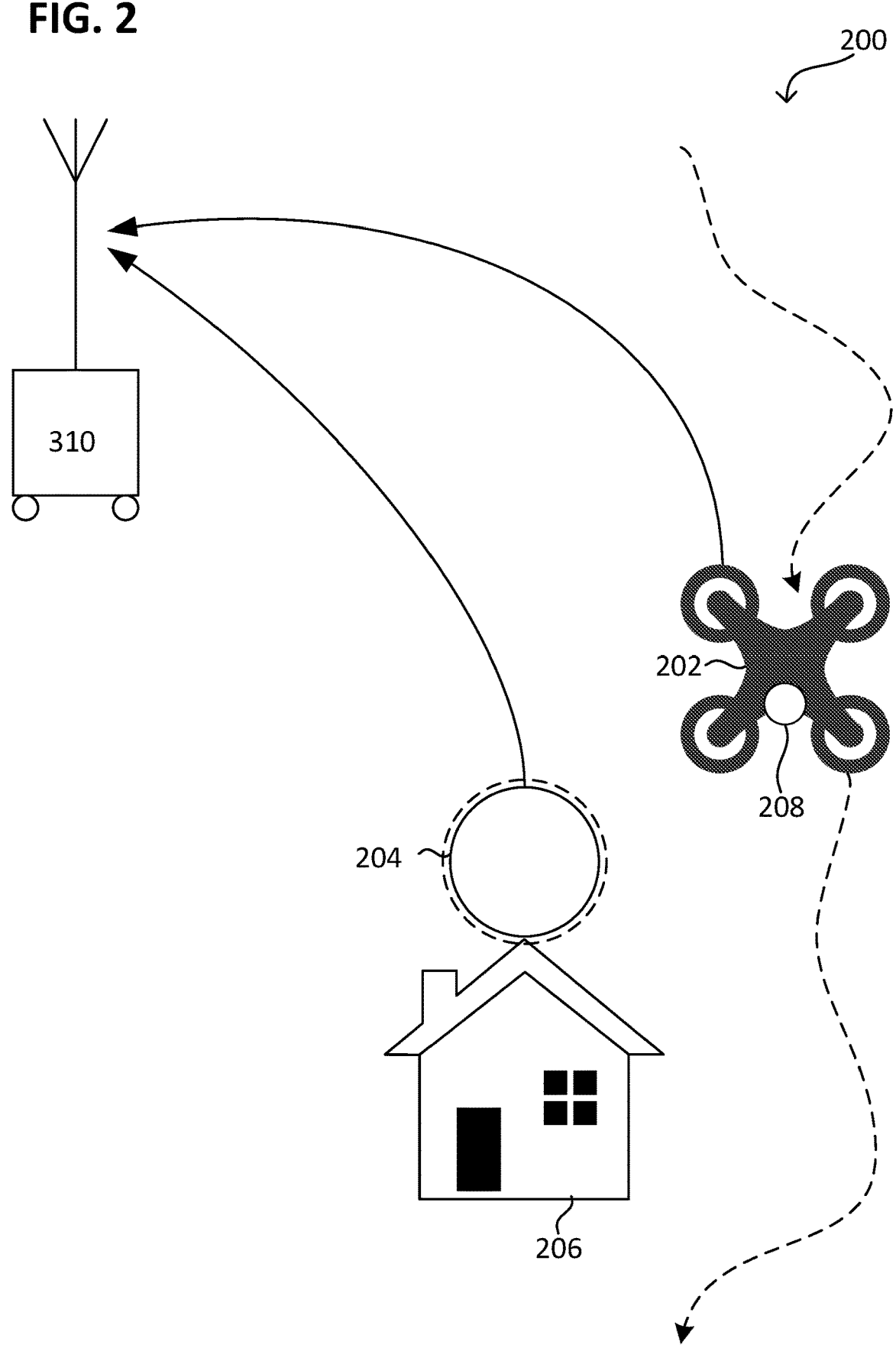

FIG. 2 illustrates the method 100 in a schematic flow diagram 200 according to various embodiments.

The method 100 may include the UAV 202 approaching the local environment of the at least one (in other words one or more than one) stationary sensor 204. The or each stationary sensor 204 may, for example, be disposed on or at a building 206. The UAV 202 may be disposed proximate the at least one stationary sensor 204, such that the onboard sensor 208 is disposed within the local environment of the at least one stationary sensor 204 (also referred as to sensor environment). Each sensor environment may, for example, be understood as spatially extended room having one or more than one stationary sensor 204 in its center.

The sensor environment may, for example, have an extension (e.g. diameter or semi-major axis) of less than about 50 meters, e.g. less than about 10 meters, e.g. less than about 5 meters, e.g. less than about 1 meter, e.g. less than about 0.5 meters, e.g. less than about 0.1 meters. The sensor environment may, for example, be a spherical region having the at least one stationary sensor 204 in its center. The sensor environment may also have another shape, e.g. ellipsoidally shaped or randomly shaped.

According to various embodiments, the UAV 202 may be part of a swarm of UAVs 202. For example, the swarm of UAVs 202 may be configured to perform the onboard sensing 103.

Optionally, the UAV 202 may reduce its flight speed during the onboard sensing 103, e.g., to zero and/or to reach a fixed position. Optionally, the UAV 202 may minimize a height difference to the at least one stationary sensor 204 during the onboard sensing 103. Optionally, the UAV 202 may reduce its spatial distance to the or each stationary sensor 204 to less than about 50 meters during the onboard sensing 103, e.g. less than about 10 meters, e.g. less than about 5 meters, e.g. less than about 1 meter, e.g. less than about 0.5 meters, e.g. less than about 0.1 meters.

Figure 3:
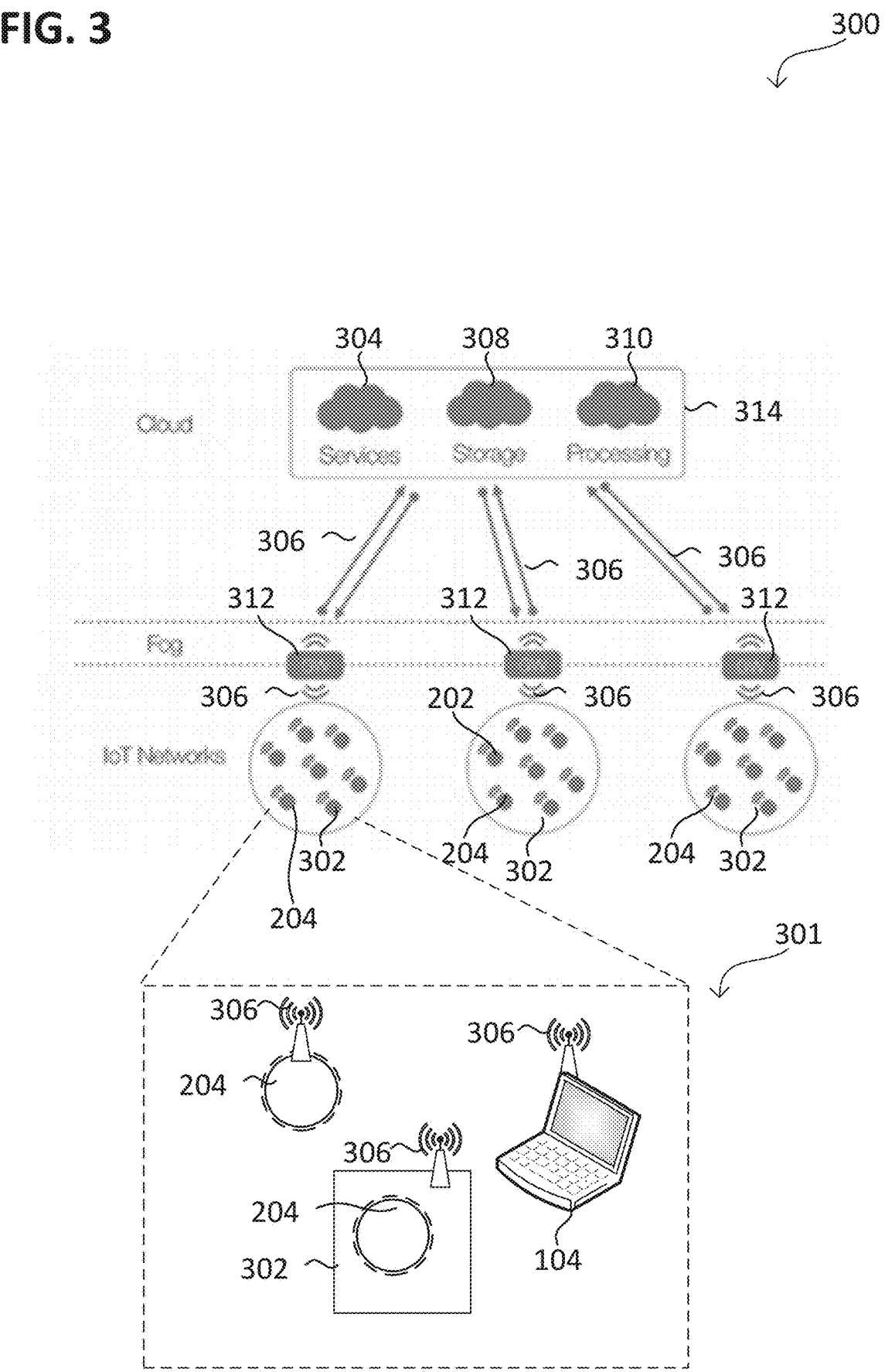
FIG. 3 shows a system in a schematic connection diagram according to various embodiments.

FIG. 3 illustrates a system 300 in a schematic connection diagram in the method 100 according to various embodiments and in a detailed view 301. The system 300 may, for example, be network based. For example, the system 300 may include or be connected to a communication network, such as, e.g., a local ad-hoc network, a wide area network (WAN), a metropolitan area network (MAN), a local area network (LAN), an Internet area network (IAN), a campus area network (CAN), a virtual private network (VPN), or the Internet. The system 300 may be configured to provide one or more network based services 304. For example, the one or more network-based services 304 may include at least one cloud-based service. The system 300 may include a plurality of communication connections 306 configured to operatively and/or communicatively connect respective entities of the system 300, such as the stationary sensor 204 or other network compatible devices 302.

For example, the plurality of communication connections 306 may include at least one wired and/or at least one wireless connection 306 (also referred as to air interface), at least one physical communications interface 306 and/or at least one physical layer 306. Additionally or alternatively, the plurality of communication connections 306 may include at least one access point 312 (e.g. a gateway 312 or other network node 312). The access point 312 may, for example, connect at least one wired and at least one wireless connection 306 with each other.

For example, the at least one wireless connection may include at least one cellular communication connection (e.g. 2G, 3G or a 4G communication connection), at least one Wi-Fi connection, at least one Bluetooth (BT) connection, at least one or at least one NFC (near field communication) connection. Additionally or alternatively, the plurality of communication connections 306 may comply with one or more of the following radio transmission access technologies: GSM (Global System for Mobile Communications), GPRS (General Packet Radio Service), UMTS (Universal Mobile Telecommunications System), CDMA2000, and/or LTE (Long Term Evolution). The plurality of communication connections 306 may also include a local area network or a metropolitan area network, e.g. according to a WLAN (Wireless Local Area Network) standard or Bluetooth standard (e.g. implementing a Bluetooth piconet).

The system 300 may include one or more than one memory 308 (also referred as to storage) and one or more than one processor 310, e.g., one or more than one stationary processor 310. The one or more than one memory 308 may be configured to store or include code segments implementing the one or more network based services via the or more than one processor 310. For example, the one or more than one processor 310 may be configured to execute the code segments at least partially. The one or more than one memory 308 and/or the one or more than one processor 310 may be communicatively connected with each other and/or be configured stationary (e.g., in a stationary server or the like).

Further, the system 300 may include a plurality of network compatible devices 302, e.g., internet of things compatible devices 302 (also referred as to IoT devices). As used herein, the term "network compatible device" 302 may refer to any object (e.g., an appliance, a sensor, etc.) that includes or provides at least one addressable interface (e.g., an Internet protocol (IP) address, a Bluetooth identifier (ID), a near-field communication (NFC) ID, etc.) and is configured to transmit and receive information over at least one connection of the plurality of communication connections 306. For example, the or each network compatible device 302 may include a passive communication interface, such as a quick response (QR) code, a radio-frequency identification (RFID) tag, an NFC tag, or the like, or an active communication interface, such as a modem, a transceiver, a transmitter-receiver, or the like. Optionally, the or each network compatible device 302 may be a network-accessible device. Optionally, the or each network compatible device 302 (also referred as to NCD) may include or be formed from one or more internet of things compatible devices 302.

For example, the or each NCD 302 may include a set of attributes (indicating, e.g., a device state or status, whether the NCD 302 device is on or off, open or closed, idle or active, available for task execution or busy, etc.) and/or a set of functions (e.g., a cooling or heating function, an environmental monitoring or recording function, a light-emitting function, a sound-emitting function, video-emitting function, etc.) that can be embedded in and/or controlled/monitored by the one or more than one processor 310, and configured to connect to the one or more network based services, e.g. via the at least one connection.

For example, the or each NCD 302 may include, but is not limited to, a refrigerator, a toaster, an oven, a microwave, a freezer, a dishwasher, a dish, a hand tool, a clothes washer, a clothes dryer, a furnace, an air conditioner, a thermostat, a television, a light fixture, a vacuum cleaner, a sprinkler, an electricity meter, a gas meter, etc. The or each NCD 302 may, additionally or alternatively, include a cell phone, a desktop computer, a laptop computer, a tablet computer, a personal digital assistant (PDAs), etc.

Optionally, the or each NCD 302 may include at least one actuator, e.g., a hydraulic actuator, a pneumatic actuator, an electric actuator (e.g., a motor,), a thermal actuator, a magnetic actuator and/or a mechanical actuator. Optionally, the or each NCD 302 may include one or more than one processor and/or one or more than one memory 308. Additionally or alternatively, the or each NCD 302 may include at least one input interface and/or at least one output interface. The at least one input interface may, for example, include a Human Interface Device (HID), Command-line user interface, Graphical User Interface, Voice-based User Interface or the like. The at least one output interface may, for example, include audio and/or video output device, such as, for example, at least one display, loudspeaker or light source.

Further, the system 300 may include the at least one stationary sensor 204 (see view 301), e.g., a plurality of stationary sensors 204. Optionally, the or each NCD 302 may include one or more than one stationary sensor 204 of the at least one stationary sensor 204.

According to various embodiments, the or each NCD 302 may be configured to communicate with the one or more than one processor 310 via the at least one communication connection of the plurality of communication connections 306, e.g. such as a wireless communication connection and a direct wired connection. The wireless interface 108 may, for example, comply with a wireless Internet protocol (IP), such as IEEE 802.11. Additionally or alternatively, the or each NCD 302 may be connected to the one or more than one processor 310 via an optical communication connection 306, such as FiOS, a cable modem 306, a digital subscriber line (DSL) modem 306, or the like. The or each NCD 302 may, for example, communicate with the one or more than one processor 310 using at least one Internet protocol (e.g., TCP/IP).

The one or more than one processor 310 and/or the one or more than one memory 308 may be implemented as a single server 314 or a plurality of structurally separated servers 314. In various embodiments, the server 314 is optional. In this case, the one or more than one processor 310 and/or the one or more than one memory 308 may be part of the or each NCD 302. For example, the or each NCD 302 may be operatively and/or communicatively connected with each other by a peer-to-peer (P2P) network 306. In such a case, the or each NCD 302 may be configured to communicate with each other directly over a wireless connection and/or a wired connection.

The one or more network based services 304 may include, for example, one or more than one manager service, environmental service, communication service and/or maintenance service. The managing may be configured to manage the or each NCD 302, for example, including operating, controlling, requesting, monitoring and/or inspecting the or each NCD 302. The one or more than one communication service may be configured to provide a personal communication, e.g., a chatting service, telephone service and/or messaging service. Additionally or alternatively, the one or more network-based services 304 may include other services, e.g. storage services, streaming services, and the like.

For example, the one or more than one manager service may implement to request data (e.g. status data) from the or each NCD 302, or may implement to control the or each NCD 302, e.g. to switch on, off, change operative status, etc. Therefore, the or each NCD 302 may include a protocol configured to communicate with the manager service.

The one or more than one environmental service may be configured to sense one or more than one local environments by the at least one stationary sensor 204 (e.g., instructing one or more than one of the first sensing 101). For example, the one or more than one environmental service may implement to request sensor data from the or each stationary sensor 204. Therefore, the or each stationary sensor 204 may include a protocol configured to communicate with the environmental service.

The one or more than one maintenance service may be configured to trigger and/or schedule the inspection routine 201 and/or the handling routine 203 (e.g., instructing one or more than one of the second sensing 103). For example, the one or more than one maintenance service may implement to control the or each UAV 202, e.g. transmit navigation information, instruct starting and returning, instruct charging, route the UAV 202, request sensor data from the or each UAV 202, and the like. Therefore, the or each stationary sensor 204 may include a protocol configured to communicate with the maintenance service.

For example, the maintenance service may include a first telemetry service configured to control the first sensing 101 and a second telemetry service configured to control the first sensing 103. Optionally, the first telemetry service and the second telemetry service may differ in their communication connection, e.g. in the used communication network (wired or wireless, WAN or LAN or piconet, cellular network, etc.), transmission access technology (e.g., 2G, WLAN, Bluetooth, etc.), transmission medium (e.g., cable, air, glass), security level (e.g., high or low), and/or an encryption protocol (e.g., Hypertext Transfer Protocol Secure, Encryption Control Protocol, etc.).

The one or more than one processor 310 may be configured to implement the one or more network-based services 304, e.g., the maintenance service and/or the environmental service.

For example, the one or more than one processor 310 may be configured to request and/or receive data from at least one stationary entity of the system 300, for example, from the or each NCD 302 and/or the or each stationary sensor 204. Further, the system 300 may be configured to process the data received and/or acquired from the at least one stationary entity of the system 300.

Additionally or alternatively, the one or more than one processor 310 may, for example, be configured to instruct the at least one stationary sensor 204 performing the stationary sensing 101, e.g. based on a sensing routine stored in the one or more than one memory 308. Additionally or alternatively, at least one stationary sensor 204 may be configured to perform the stationary sensing 101 following a sensing routine stored in the at least one stationary sensor 204 or commonly provided for each stationary sensor 204 of the at least one stationary sensor 204. The sensing routine may, for example, define a plurality of stationary sensings 101, in a periodical manner. For example, the stationary sensing 101 may be performed at least once per day, hour, minute, second or multiple times per second, e.g. more than 100 or 1000 times per second.

For example, the one or more than one processor 310 may be configured to request and/or receive data from at least one mobile entity of the system 300, for example, from at least one UAV 202, e.g. the or each UAV 202 of the swarm of UAVs 202, e.g. based on an inspection scheme stored in the one or more than one memory 308. Additionally or alternatively, at least one UAV 202 may be configured to perform the onboard sensing 103 following an inspection scheme stored in a memory of the at least one UAV 202. The inspection scheme may define and/or schedule the chronological order, in which the at least one UAV 202 operates (e.g. flies between each sensor of the at least one stationary sensor 204).

For example, the one or more than one processor 310 may be configured to instruct and/or to route the UAV 202 via the communication connection 306, e.g. a mobile and/or cellular communication connection (e.g. 2G, 3G or a 4G wireless communication connection). Additionally or alternatively, the one or more than one processor 310 may be configured to remotely control the UAV 202 via the communication connection 306. This configuration may provide high flexibility for operating the UAV 202.

In a more autonomous configuration, the one or more than one processor 310 may be configured to transmit to the UAV 202, via communication connection 306, data including information of the inspection routine, e.g., identifying the at least one stationary sensor 204 to be inspected and/or identifying their position. The inspection routine may, for example, include information of each of the at least one stationary sensor 204, for example, its position; its priority of maintenance; its priority of inspection; its level of reliability; a related inspection request; its type of sensor; or geographic coordinates in positional proximity to the at least one stationary sensor. For example, the one or more than one processor 310 may be configured to provide a complete inspection scheme and/or navigation information to the UAV 202. The navigation information may include data representing each position of the at least one stationary sensor 204 and/or may include data representing a flight path through each sensor environment. For example, the UAV 202 may be configured to calculate the flight path based on each position of the at least one stationary sensor 204. In this configuration, the UAV 202 may operate substantially autonomously. For example, the inspection may be facilitated for sensors spread over a wide geography and/or in a topography, which blocks radio signals.

More general, at least one processor of the system 300 (e.g., of the one or more than one processor 310 and/or of the at least one UAV 202) may be configured to process the inspection routine and/or provide an inspection scheme based on the inspection routine. The inspection scheme may be configured to define and/or schedule the chronological order, in which the at least one UAV 202 operates (e.g. flies between each sensor of the at least one stationary sensor 204).

Optionally, at least one processor of the system 300 may evaluate a priority of inspection, e.g. based on the period of time since last inspection and/or since last maintenance, for each sensor of the at least one stationary sensor 204. A flight path of the UAV 202 and/or a schedule of the inspection routine 201 may, for example, be based on the priority of inspection.

At least one of the inspection routine and/or the sensing routine may be, for example, stored in a database by a memory of the system 300 (e.g., of the one or more than one memory 308 or of the UAV 202).

The one or more than one processor 310 may be further configured to compare 107 the stationary result and the onboard result and classify 107 the at least one stationary sensor 204 based on a result of the comparison 105. For example, the one or more than one processor 310 may be configured to modify, generate and/or update the inspection routine and/or the sensing routine based on a result of the comparison 105. For example, the one or more than one processor 310 may be configured to modify, generate and/or update the classification of the at least one stationary sensor 204 based on a result of the comparison 105.

According to various embodiments, the one or more than one processor 310 may be configured to implement the inspection routine 201 and/or the handling routine 203, e.g., via the one or more network based services 304.

In an illustrative example, manipulated sensor data reported by a stationary heat sensor 204 may activate a false fire alert or suppress the needed fire alert. The same result could result from a malfunctioning stationary heat sensor 204 or malfunctioning to the stationary heat sensor 204. In this example, it is a critical ability to detect effectively the malfunction or compromised stationary sensor 204. According to various embodiments, the inspection routine 201 provides for a "double check", e.g. if the received sensor data appears suspicious or is determined to be abnormal. The inspection routine 201 reveals, whether the at least one stationary sensor 204 operates reliable or not. If the result of the comparison 105 reveals that the at least one stationary sensor 204 operates unreliably, the fire alert system may be modified, e.g. instructed to ignore data from the unreliable operating at least one stationary sensor 204.

For example, for each sensor of at least one stationary sensor 204 (e.g., multiple stationary sensors 204) the inspection routine 201 may be performed. In other words, each sensor of at least one stationary sensor 204 may be classified based on the comparison result.

Optionally, each stationary result of the at least one stationary sensor 204 (e.g., at least one stationary result for each individual stationary sensor 204, e.g., multiple stationary results for each individual stationary sensor 204) may be recorded, e.g., stored in the one or more than one memory 308, e.g. using a database.

Figure 4:
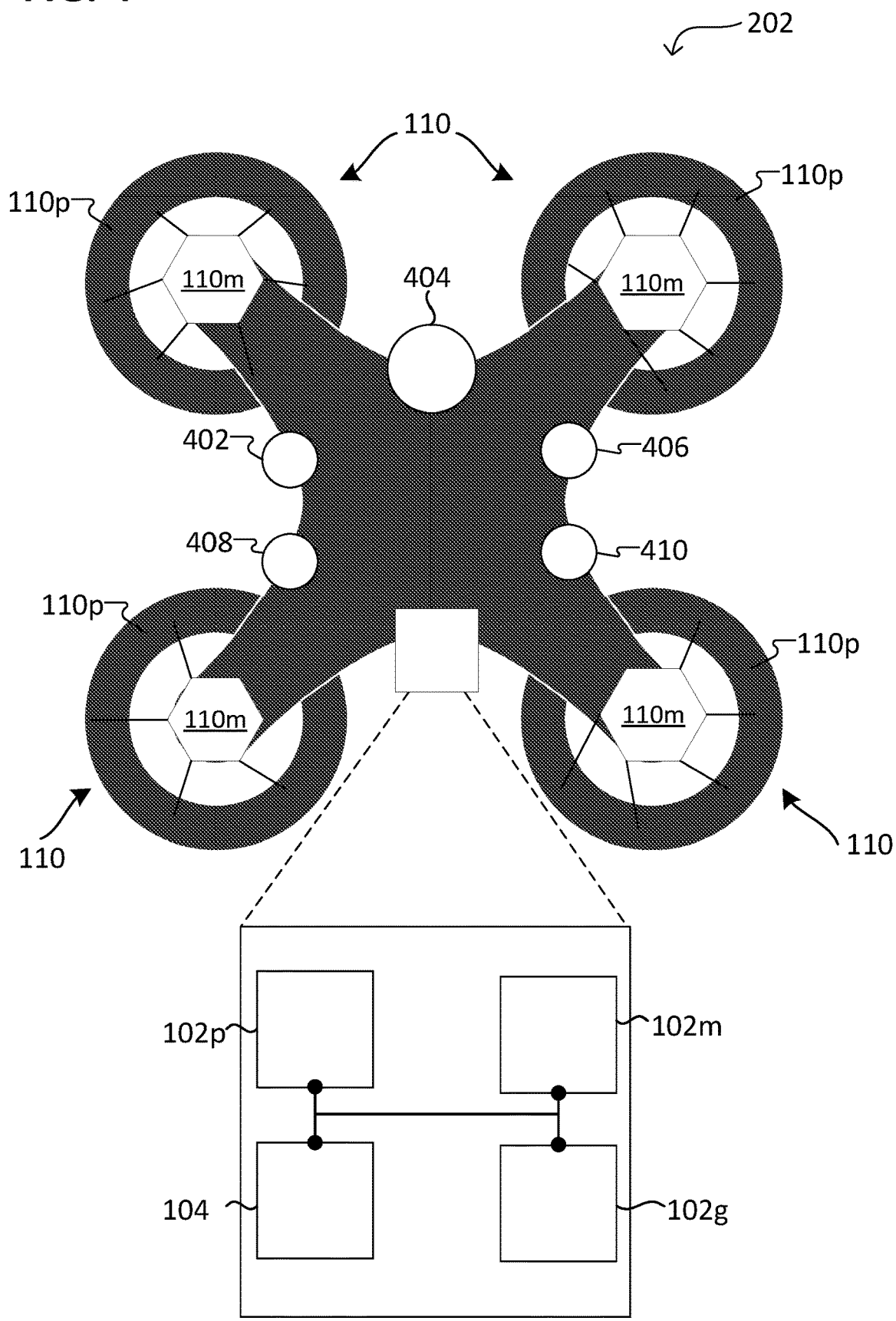
FIG. 4 shows an UAV in a schematic perspective view according to various embodiments.

FIG. 4 illustrates an UAV 202 in a schematic perspective view according to various embodiments.

The UAV 202 may include a plurality of (e.g., three or more than three, e.g., four, six, eight, etc.) vehicle drive arrangements 110. Each of the vehicle drive arrangements 110 may include at least one drive motor 110*m* and at least one propeller 110*p* coupled to the at least one drive motor 110*m*. The one or more drive motors 110*m* of the UAV 202 may be electric drive motors.

Further, the UAV 202 may include one or more processors 102*p* (e.g., processing unit 102*p*) configured to control flight or any other operation of the UAV 202 including but not limited to navigation, image analysis, position calculation, and any method or action described herein. One or more of the processors 102*p* may be part of a flight controller or may implement a flight controller. The one or more processors 102*p* may be configured, for example, to provide a flight path based at least on an actual position of the UAV 202 and a desired target positon (e.g. the position of the at least one stationary sensor 204) for the UAV 202. In some aspects, the one or more processors 102*p* may control the UAV 202. In some aspects, the one or more processors 102*p* may directly control the drive motors 110*m* of the UAV 202, so that in this case no additional motor controller may be used. Alternatively, the one or more processors 102*p* may control the drive motors 110*m* of the UAV 202 via one or more additional motor controllers. The one or more processors 102*p* may include or may implement any type of controller suitable for controlling the desired functions of the UAV 202. The one or more processors 102*p* may be implemented by any kind of one or more logic circuits.

According to various aspects, the UAV 202 may include one or more memories 102*m*. The one or more memories may be implemented by any kind of one or more electronic storing entities, e.g. one or more volatile memories and/or one or more non-volatile memories. The one or more memories 102*m* may be used, e.g., in interaction with the one or more processors 102*p*, to build and/or store image data, navigation information, the inspection scheme, ideal positions, positional calculations, or alignment instructions.

Further, the UAV 202 may include one or more power supplies 104. The one or more power supplies 104 may include any suitable type of power supply, e.g., a directed current (DC) power supply. A DC power supply may include one or more batteries (e.g., one or more rechargeable batteries), etc.

According to various aspects, the UAV 202 may include one or more sensors 208 (also referred as to onboard sensors 208). The one or more sensors 208 may be configured to monitor a vicinity of the UAV 202. The one or more sensors 208 may be configured to detect obstacles in the vicinity of the UAV 202. The one or more sensors 208 may include, for example, one or more cameras (e.g., a depth camera, a stereo camera, a thermal imaging camera, etc.), one or more ultrasonic sensors, etc. The UAV 202 may further include a position detection system 102*g*. The position detection system 102*g* may be based, for example, on Global Positioning System (GPS) or any other available positioning system. Therefore, the one or more processors 102*p* may be further configured to modify the flight path of the UAV 202 based on data obtained from the position detection system 102*g*. The sensors 208 may be mounted as depicted herein, or in any other configuration suitable for an implementation.

According to various aspects, the one or more processors 102*p* may include at least one transceiver configured to provide an uplink transmission and/or downlink reception of radio signals including data, e.g. video or image data and/or commands. The at least one transceiver may include a radio frequency (RF) transmitter and/or a radio frequency (RF) receiver.

The one or more processors 102*p* may further include an inertial measurement unit (IMU) and/or a compass unit. The inertial measurement unit may allow, for example, a calibration of the UAV 202 regarding a predefined plane in a coordinate system, e.g., to determine the roll and pitch angle of the UAV 202 with respect to the gravity vector (e.g. from planet earth). Thus, an orientation of the UAV 202 in a coordinate system may be determined. The orientation of the UAV 202 may be calibrated using the inertial measurement unit before the UAV 202 is operated in flight modus. However, any other suitable function for navigation of the UAV 202, e.g., for determining a position, a flight velocity, a flight direction, etc., may be implemented in the one or more processors 102*p* and/or in additional components coupled to the one or more processors 102*p*.

The one or more sensors 208 may, for example, include at least one temperature sensor 402 and/or at least one radiation sensor 404 (e.g. an electromagnetic sensor, also a particle sensor or other radiation sensor). Additionally or alternatively, the one or more sensors 208 may include at least one humidity sensor 406 (e.g. steam sensor) and/or at least one luminance sensor 408. Additionally or alternatively, the one or more sensors 208 may include at least one pollution sensor 410 (e.g. air pollution and/or water pollution) and/or at least one chemical composition sensor 410. However, any other type of sensor as described above may be integrated in the UAV 202.

Figure 5:
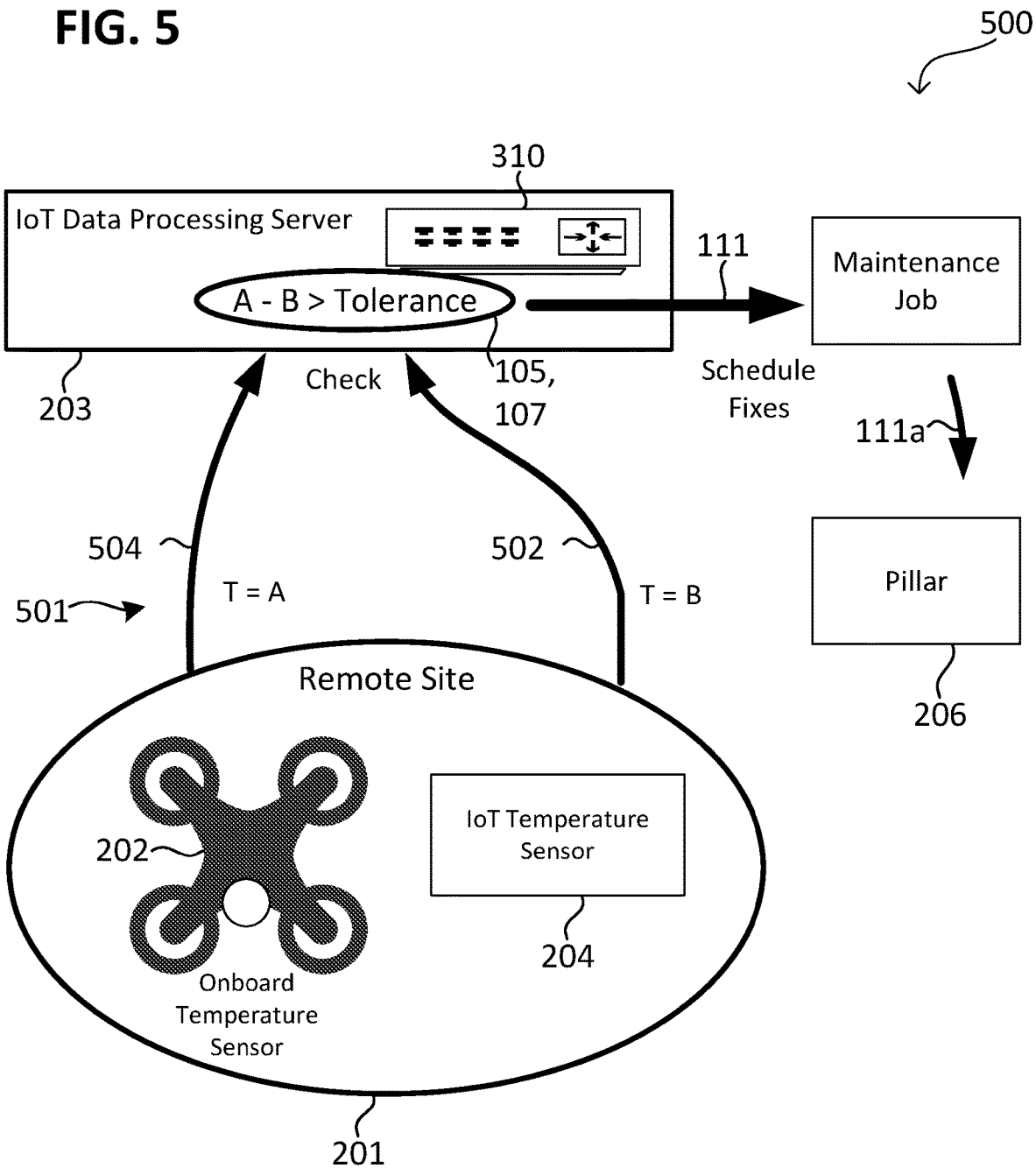
FIGS. 5 to 8 respectively show the method in a flow diagram according to various embodiments.

FIG. 5 illustrates the method 100 in a schematic flow diagram 500 according to various embodiments.

The UAV 202 may approach the at least one stationary sensor 204, e.g., entering its sensor environment. The at least one stationary sensor 204 may, for example, be disposed on or at a pillar 206. The UAV 202 may fly proximate the at least one stationary sensor 204, such that the onboard sensor 208 is disposed in the sensor environment.

The method may include in 201 performing the stationary sensing 101 and the onboard sensing 103. The method may further include in 501 transmitting first data (also referred as to first sensor data) representing the stationary result via a first communication connection 502 to the one or more than one processors. The method may further include in 501 transmitting second data (also referred as to second sensor data) representing the onboard result via a second communication connection 504 (e.g., a telemetry channel) to the one or more than one processors.

The first communication connection 502 (e.g., a first communication channel) and the second communication connection 504 (e.g., a second communication channel) may differ from each other, e.g. in the used communication network (wired or wireless, WAN or LAN or piconet, cellular network, etc.), transmission access technology (e.g., 2G, WLAN, Bluetooth, etc.), transmission medium (e.g., cable, air, glass), security level (e.g., high or low), and/or an encryption protocol (e.g., Hypertext Transfer Protocol Secure, Encryption Control Protocol, etc.).

The one or more than one processor may be configured to receive the first data via a first communication interface and the second data via a second communication interface. The first communication interface may be configured in accordance with (e.g. to provide) the first communication connection 502. The second communication interface may be configured in accordance with (e.g. to provide) the second communication connection 504.

In an example, the first communication connection 502 may include or be formed from a wired transmission access technology, such as a landline. The second communication connection 504 may include or be formed from a wireless transmission access technology, such as a cellular transmission access technology. For example, the cellular transmission access technology may comply with one or more than one of the radio transmission access technologies described before.

In an additional or alternative example, the first communication connection 502 may be unencrypted or be encrypted with a first security level. The second communication connection 504 may be encrypted, e.g. with a second security level higher than the first security level. For example, a larger key size and/or a higher number of keys may increase the security level. Additionally or alternatively, including a certificate identifying the UAV 202 may increase the security level. Additionally or alternatively, the security level may be increased, by encrypting based on an encryption protocol having a higher security level. Optionally the security level may be increased, by generating the one or more than one key used for encrypting the second communication connection 504 periodically, e.g. daily.

The method may further include in 203, comparing 105 of the stationary result and the onboard result and classifying 107 the at least one stationary sensor based on a result of the comparison 105.

The comparison 105 of the stationary result and the onboard result may, for example, include determining a difference between the stationary result and the onboard result (also referred as to sensing difference). For example, the stationary result and the onboard result may each include at least one parameter and/or at least one value representing the result. The comparison 105 may further include, determining whether the sensing difference fulfills a predefined criterion, for example, whether the sensing difference exceeds a predetermined threshold.

The classifying 107 may include assigning one out of multiple classes to the at least one stationary sensor 204. Each of the classes may indicate a certain level of reliability. For example, a first class may indicate that the at least one stationary sensor 204 is unreliable and a second class may indicate that the at least one stationary sensor 204 is reliable. Other optional classes may indicate other levels of reliability between the first class and the second class. Illustratively, if the sensing difference is too high, it can be assumed, that the at least one stationary sensor 204 operates unreliable, e.g. due to malfunction or corruption. For example, if the UAV 202 provides a temperature of 33° C. whereas the at least one stationary sensor 204 provides a temperature of 23° C., it can be assumed that the at least one stationary sensor 204 is malfunctioning.

Optionally, the classification result may, for example, be reported to a maintenance service provider and/or may be stored, e.g., in the database. Illustratively, the at least one stationary sensor 204 may be classified as "unreliable", e.g. as "out of order", which is stored in the database.

Optionally, the comparison 105 is based on context information. The context information can be understood as information providing additional details to the stationary sensing 101 and/or the onboard sensing 103. For example, the context information may include a time stamp representing the time and/or duration of the stationary sensing 101 and/or the onboard sensing 103. Additionally or alternatively, the context information may include a geotag representing the position of the stationary sensing 101 and/or the onboard sensing 103, e.g. a position of the UAV 202 during the onboard sensing 103. Illustratively, the comparison 105 can be configured to accept a higher sensing difference before the at least one stationary sensor 204 is assumed to be unreliable, if the context information reveals that the chronological and spatial proximity could not be minimized. For example, if the context information reveal a large chronological and/or spatial difference between the stationary sensing 101 and the onboard sensing 103, the threshold for the comparison 105 may be increased. More generally, the criterion for the comparison 105 may be modified based on the context information.

In 203, the method may further include, generating 111 a maintenance request based of the classification result. Illustratively, if the comparison 105 reveals, that the at least one stationary sensor 204 is unreliable, the maintenance request may be generated and/or reported. The maintenance request may, for example, be reported to a maintenance service and/or may be stored in the database.

In 203, the method may further include performing a manual maintenance 111a (e.g. performed by a person) in response to the maintenance request. The manual maintenance 111a may include at least one of the following: inspecting, calibrating, replacing, repairing, and/or adapting (the at least one stationary sensor 204). In response to the manual maintenance 111a, a maintenance confirmation may be sent back, e.g. confirming that the at least one stationary sensor 204 was under maintenance. The maintenance confirmation may optionally include information indicating the result of the manual maintenance.

In response to the maintenance confirmation, the classification may be modified and/or updated (also referred as to re-classifying), e.g. into the first class (e.g. "reliable" or "in order"). Additionally or alternatively, an inspection routine 201 may be started to determine the result of the manual maintenance 111a in response to the maintenance confirmation.

Additionally or alternatively to generating 111 the maintenance request, the first data received from the at least one stationary sensor 204 may be ignored based of the classification result, e.g., if classified as "unreliable". Illustratively, the at least one stationary sensor 204 classified as "unreliable" may be removed from any influence on the network based services 304. The ignoring may be permanent (e.g. the at least one stationary sensor 204 may be abandoned) or temporary, e.g. until the next inspection routine 201 is scheduled for this sensor, until the sensor is re-classifying and/or until receiving the maintenance confirmation.

For example, a central processing unit 310 may compare the second data against the corresponding measurements coming from a specific stationary sensor 204 (e.g. as part of an IoT entity) allowing detection of contradictions/anomalies. Stationary sensor 204 marked as "out of order" can be reported for maintenance/replacement and/or be ignored temporarily or permanently.

Figure 6:
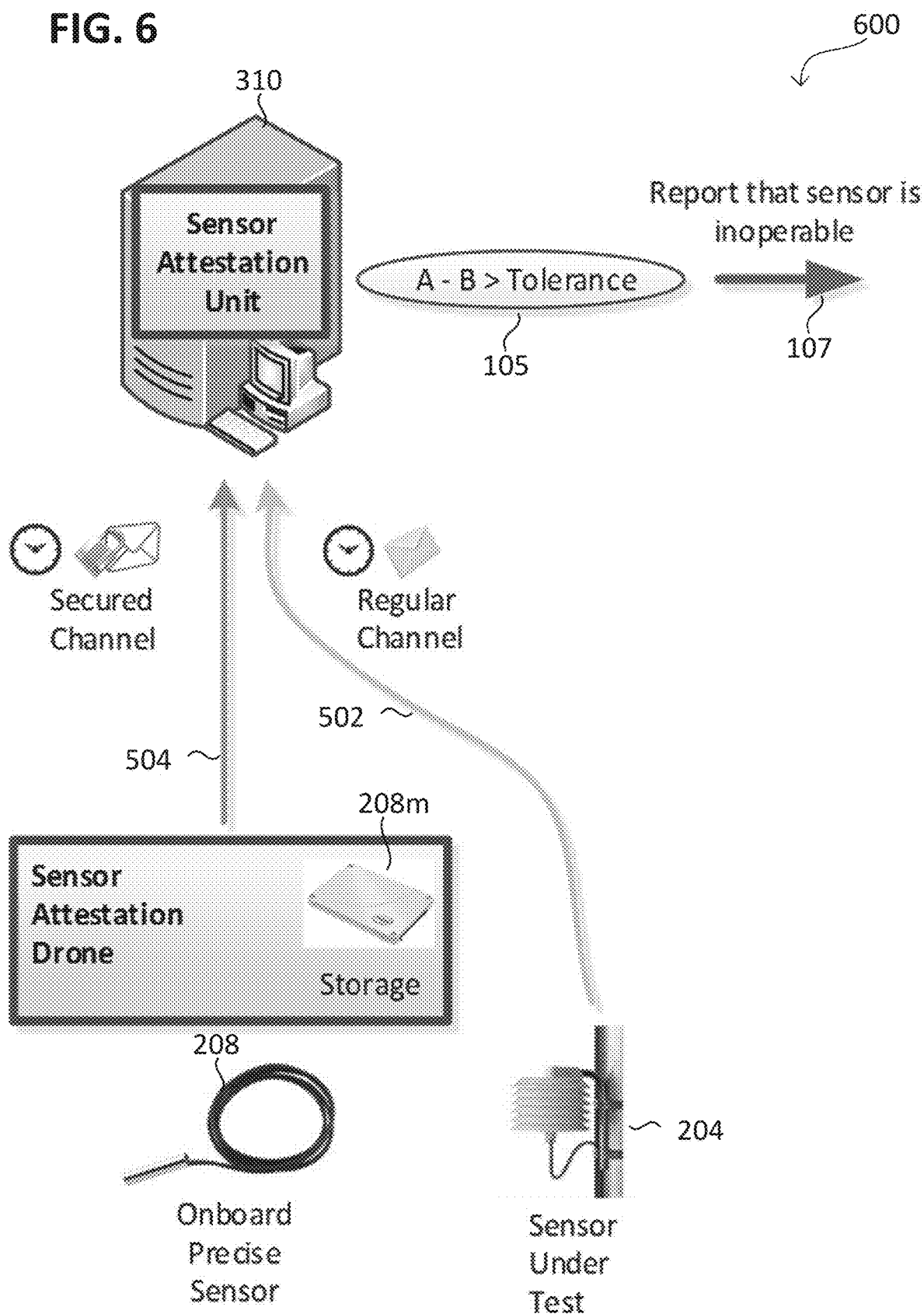

FIG. 6 illustrates the method 100 in a schematic flow diagram 600 according to various embodiments.

As described before, the first communication connection 502 may be unencrypted, wherein the second communication connection 504 may be encrypted. Additionally or alternatively, the first communication connection 502 may be encrypted with a first security level, wherein the second communication connection 504 may be encrypted with a second security level higher than the first security level.

Additionally or alternatively to this configurations, a higher security level may be provided for the second communication connection 504 by reducing the risk of unwanted listeners. Therefore, the second communication connection 504 may include a smaller communication range, transmission power and/or communication duration than the first communication connection 502.

For example, the second communication connection 504 may be a short-range communication connection (using a short-range access technology) or a wired communication connection (using wired access technology). The range of a communication connection may refer to the accumulated distance, over which data is transferred wirelessly between the communication partners. The short-range communication connection may, for example, include Bluetooth, NFC or Wi-Fi. The short-range access technology may be provided in a secured area, e.g. a hive of the swarm (illustratively, home).

Additionally or alternatively, the first communication connection 502 may be a long-range communication connection (using a long-range access technology). The long-range communication connection may include, for example, one of the radio transmission access technologies as described before, e.g. a cellular transmission access technology.

For example, the or each UAV 202 may include a memory 208m, which is configured to store at least one (e.g., each) onboard result. For example, the memory 208m may store one or more than one onboard result corresponding for each inspected stationary sensor 204 of the at least one stationary sensor 204. Illustratively, the UAV 202 may perform the onboard sensing for a plurality of stationary sensors 204, store the corresponding onboard results and transmits them when a save region (e.g. the swam hive) is reached. Optionally, the one or more than one onboard result may be stored temporally, e.g., until transmitted to the one or more than one memory 308.

If each of the at least one stationary sensor 204 is providing multiple of stationary results (which may be stored by the one or more than one memory 308), it may be required to match them with the one or more than one temporally stored onboard result. Therefore, the stored and transmitted onboard results may optionally include context information, e.g. the time stamp. The context information may enable to determine a stationary result out of a multiple of stationary results, which is chronologically closest to the time stamp. The comparison 105 may than use the determined stationary result.

For example, an UAV 202 integrated with one or more than one (e.g., a multiple of) precise onboard sensor 208 for sensor validation (SAD) may be provided. Further, a central data processing server 314 integrated with a sensor attestation unit (SAU) may be provided. The SAD may be equipped with a one or more than one (e.g., a multiple of) precise onboard sensor connected to the processing unit 102p that may sample data in the position of the one or more than one onboard sensor 208 and record it with contextual data (e.g. context information). This contextual data may be transferred over a dedicated secured telemetry channel to the central data processing server 314 or be collected in a storage device 102m of the UAV 202 that will be read in a home position using local interfaces (e.g. BT, Wi-Fi) when returning home, e.g., returning to the swarm hive.

The control server may be configured to include at least one additional SAU subsystem for accepting measurements supplied by the SAD and comparing it with regular measurements. The additional SAU may be configured to determine a difference between the onboard result (illustratively, a sample) and the stationary result (illustratively, the real measurement) and optionally trigger a maintenance service for the stationary sensor 204, e.g., if the difference exceeds a predefined threshold (illustratively, a tolerance value). Optionally, all the measurements of the SAD may be marked by the time stamp for further correlation.

Figure 7:
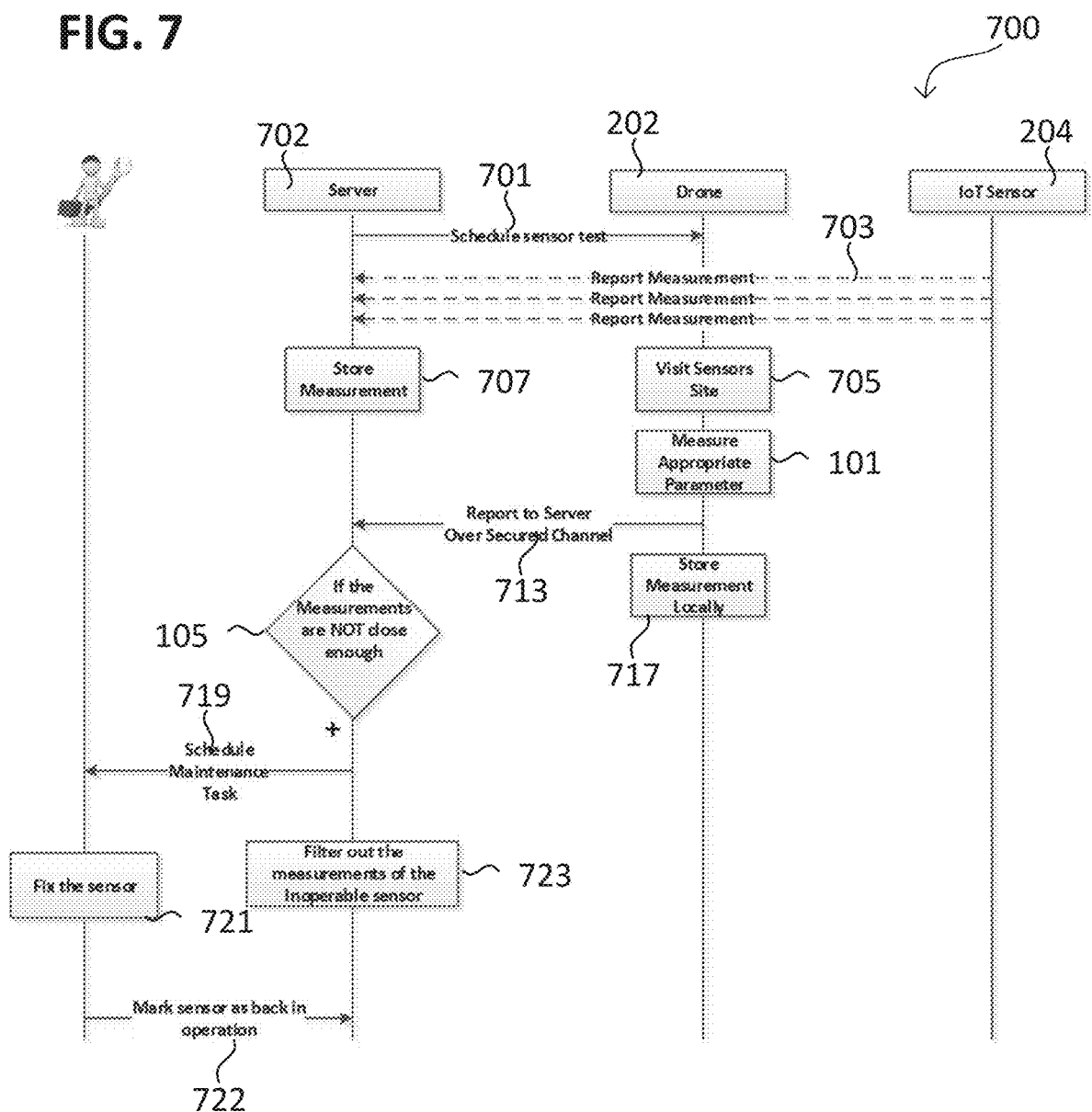

FIG. 7 illustrates the method 100 in a schematic flow diagram 700 according to various embodiments.

The method 100 may be performed by a system 300 as described herein. The system 300 may include the UAV 202, one or more than one (e.g., a plurality of) stationary sensor 204 and a circuit 702 including the one or more than one processors 310. For example, the circuit 702 may be implemented by software and/or in a stationary calculation unit, e.g. a server 314.

The method 100 may include in 701 the circuit 702 initiating (e.g., scheduling) an inspection routine 201 for at least one stationary sensor 204 of the one or more than one stationary sensor 204. For example, the circuit 702 may instruct the UAV 202 to perform the onboard sensing 103 in at least a portion of the or each sensor environment of the at least one stationary sensor 204. Optionally, the circuit 702 may instruct (e.g., each stationary sensor 204 of) the at least one stationary sensor 204 to perform the stationary sensing 101 at least one once, e.g. sustained, periodically or at least repeatedly during a predetermined timeframe. Additionally or alternatively, (e.g., each stationary sensor 204 of) the at least one stationary sensor 204 may be configured to perform the stationary sensing 101 on its own motion, e.g. sustained, periodically or at least repeatedly during the predetermined timeframe. For example, (e.g., each stationary sensor 204 of) the at least one stationary sensor 204 may report a plurality of stationary results to the circuit 702.

The method 100 may include in 705 the UAV 202 to fly to or into the or each sensor environment in response to initiating an inspection routine 201. Therefore, the circuit 702 may provide navigation information representing the position of (e.g., each stationary sensor 204 of) the at least one stationary sensor 204. The navigation information may include one or more than one coordinates or a complete flight route.

The method 100 may include in 103 the UAV 202 to perform the onboard sensing, e.g., regarding (e.g., each stationary sensor 204 of) the at least one stationary sensor 204.

The method 100 may include in 703, (e.g., each stationary sensor 204 of) the at least one stationary sensor 204 to report one or more than one stationary result (also referred as to "report measurement" 703). For example, (e.g., each stationary sensor 204 of) the at least one stationary sensor 204 may provide (e.g. transmit) first sensor data representing the one or more than one stationary result. The first sensor data may include or be formed from environmental information of the or each sensor environment.

The method 100 may include in 713, that the UAV 202 report one or more than one onboard result (also referred as to "report to server" 713). For example, the UAV 202 may provide (e.g. transmit) second sensor data representing the one or more than one onboard result. The second sensor data may include or be formed from environmental information of at least a portion of the or each sensor environment, the local environment of each stationary sensor 204 of the at least one stationary sensor 204.

The method 100 may optionally include in 707, the circuit 702 storing the first sensor data. Additionally or alternatively, the method 100 may include in 717 the UAV 202 storing the second sensor data. The UAV 202 storing the second sensor data may be performed additionally or alternatively to performing the transmission 713 of the second sensor data. Illustratively, the second sensor data may be stored and later transmitted for security reasons (e.g., via a short-range access technology). Additionally or alternatively, the second sensor data may be transmitted subsequent to the onboard sensing 103 and stored for later double-checking, e.g., after the UAV 202 returned home (e.g., to the hive).

The method 100 may include in 105 the comparison. If the comparison reveals for a certain stationary sensor 204 of the at least one stationary sensor 204 less or almost no difference between the onboard result and the stationary result, the stationary sensor 204 may be classified to indicate that the stationary sensor 204 is "reliable". Otherwise, the stationary sensor 204 may be classified to indicate that the stationary sensor 204 is "unreliable" and optionally the maintenance request is generated in 719. Optionally, the maintenance request may schedule the manual maintenance.

The method 100 may optionally include in 721 the manual maintenance and in 722 the re-classifying the at least one stationary sensor 204, e.g., to indicate a result of the manual maintenance and/or to indicate the maintenance confirmation.

Optionally the method 100 may include in 723 ignoring sensor data from a certain stationary sensor 204 of the at least one stationary sensor 204 as long as the classification of the stationary sensor 204 indicates that the stationary sensor 204 is "unreliable", or as long as the classification of the stationary sensor 204 does not indicate that the stationary sensor 204 is "reliable".

Figure 8:
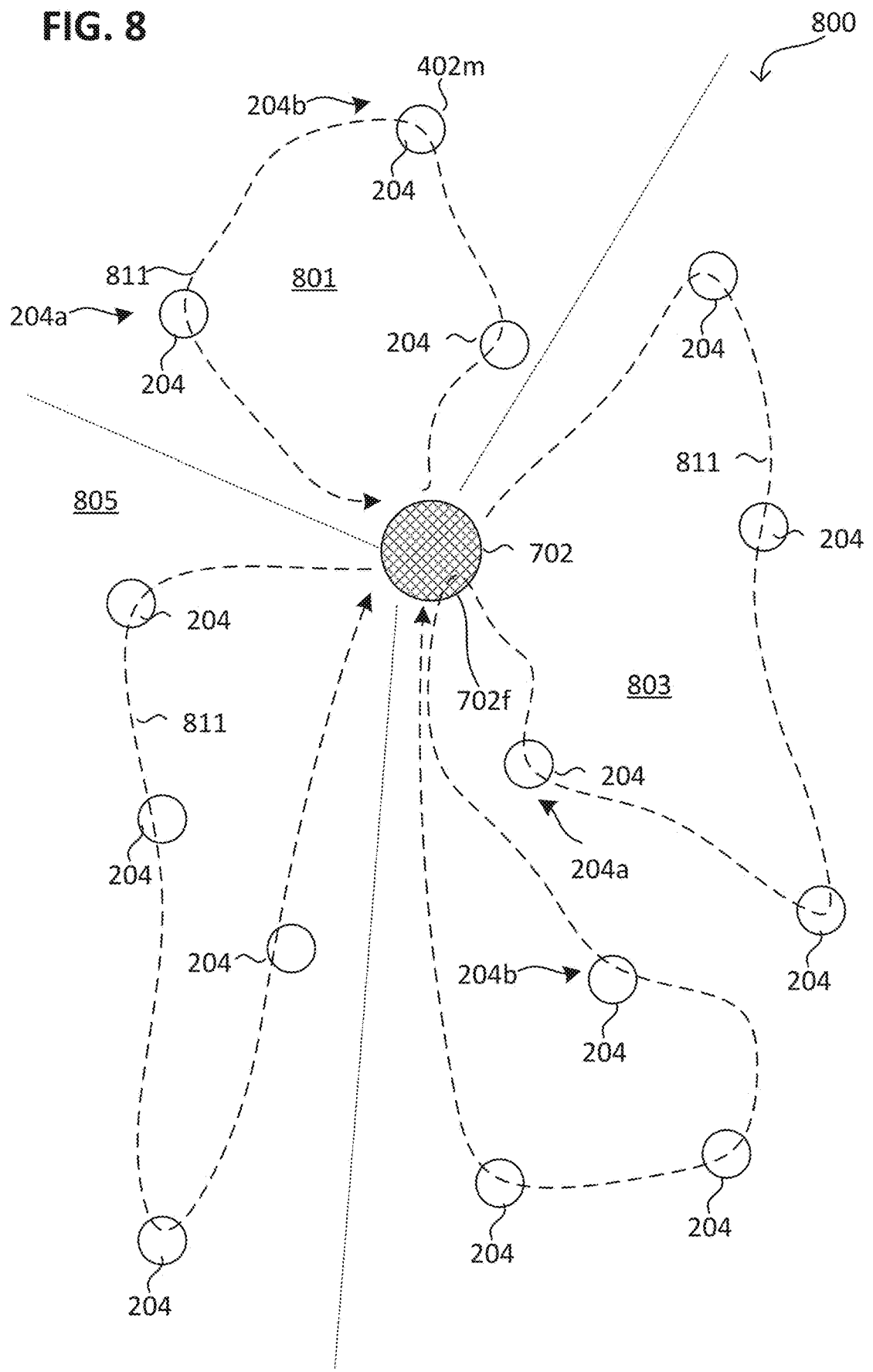

FIG. 8 illustrates the method 100 in a schematic flow diagram 800 according to various embodiments.

The system 300 may include a plurality of stationary sensors 204. The plurality of stationary sensors 204 may include a plurality of sensor groups, e.g. at least one first sensor group 801 and second sensor group 803 and optionally at least one (e.g. more than one) further sensor group 805. The (e.g., all) sensor environments (each including one or more than one stationary sensors 204) may be disposed distant from each other.

Each sensor group 801, 803, 805 may include one or more than one stationary sensor 204, e.g. more than two (3, 4, 5, 6, 7, 8, 9 or 10) stationary sensors 204. The stationary sensors 204 of the system 300 may be, for example, grouped by sector and/or relative distance to each other.

The system 300 may include a plurality of UAVs 202, e.g. two or more than two (3, 4, 5, 6, 7, 8, 9 or 10) UAVs 202. Each UAV 202 may be assigned to at least one sensor group 801, 803, 805 of the plurality of sensor groups. Each UAV 202 may perform the onboard sensing 103 in the or each sensor environment of the at least one sensor group 801, 803, 805, which is assigned to the UAV 202.

The method 100 may include: providing a flight path for the UAV 202. For example, the first sensor group 801 may include a first stationary sensor 204a at a first position and a second stationary sensor 204a at a second position. The flight path may cross the sensor environments (schematically illustrated as circles) at the first position and the second position, for example, each sensor environment of the first sensor group 801.

For a long flight path (see for example, a third sensor group 803), the method may optionally include in 702f, refueling the UAV 202 during flight between the local environment of a first stationary sensor and the local environment of a second stationary sensor. Refueling may include electrical charging, replenishing a charge of, replacing energy storage, or other techniques of providing stored energy to the UAV 202.

The system 300 may be network interconnected and include or be formed from a cyber-physical system (CPS). The cyber-physical system may include a plurality of physical mechanisms (e.g., actuators) that are controlled or monitored by computer-based algorithms, and integrated with the network. The computer-based algorithms may provide for processing information, the information representing data received from the at least one stationary sensor 204. Examples for a CPS may include a smart grid, autonomous automobile systems, a medical monitoring, a process control systems, a robotics systems, and an automatic pilot avionics.

Further, various embodiments will be described in the following.

Example 1 is a method, including: at least one stationary sensor performing a first sensing of its local environment; a sensor of an UAV performing a second sensing of at least a portion of the local environment of the at least one stationary sensor; comparing a first result of the first sensing and a second result of the second sensing; classifying the at least one stationary sensor based on a result of the comparison 105.

Example 2a is a method, including: performing a first sensing by at least one stationary sensor of its local environment; performing a second sensing by a sensor of an unmanned aerial vehicle of at least a portion of the local environment of the at least one stationary sensor; comparing a first result of the first sensing and a second result of the second sensing; classifying the at least one stationary sensor based on a result of the comparison.

Example 2b is the method of example 1 or 2a, wherein the UAV is a flying UAV.

Example 3 is the method of example 1 to 2b, further including: the UAV flying into the local environment of the at least one stationary sensor (e.g. approaching the or in positional proximity to the at least one stationary sensor).

Example 4 is the method of one of the examples 1 to 3, further including, the UAV receiving navigation information (e.g. including destination information and/or routing information), the navigation information representing a position of the at least one stationary sensor or a flight path thereto; and the UAV flying in accordance with the navigation information.

Example 5a is the method of one of the examples 1 to 4, further including: an inspection request (e.g. repeatedly, e.g., periodically) triggering the UAV to perform the second sensing or approach the at least one stationary sensor.

Example 5b is the method of one of the examples 1 to 5a, wherein the at least one stationary sensor includes a plurality of stationary sensors (e.g. each stationary sensor of the plurality of stationary sensors configured to perform the first sensing of its local environment), of which each is classified.

Example 6a is the method of one of the examples 1 to 5b, wherein the at least one stationary sensor includes a first stationary sensor having a first local environment and a second stationary sensor having a second local environment; the sensor of the unmanned aerial vehicle performing the second sensing of at least a portion of the first local environment and of at least a portion of the second local environment; and optionally, the unmanned aerial vehicle covers a distance between the second sensing of at least a portion of the first local environment and the second sensing of at least a portion of the second local environment.

Example 6b is the method of example 6a, wherein the first local environment and the second local environment are disposed distant from each other (e.g., more that each of them is extended parallel to the distance).

Example 6c is the method of one of the examples 4 to 6b, wherein the at least one stationary sensor includes a first stationary sensor at a first position and a second stationary sensor at a second position; wherein the navigation information represent the first position and the second position or an flight path between.

Example 7 is the method of one of the examples 6a to 6c, further including: refueling (e.g. charging, replenishing a charge, replacing energy storage) the UAV during flight between the local environments of the first stationary sensor and the second stationary sensor, e.g., between the second sensing of at least a portion of the first local environment and the second sensing of at least a portion of the second local environment.

Example 8 is the method of one of the examples 1 to 7, further including: the UAV comparing a first value to a second value, the first value representing a distance for an intended flight path of the UAV to or through the local environment of the at least one stationary sensor, and the second value representing a remaining operating range of the UAV 202 (e.g., defined by remaining fuel, e.g., charge); wherein a flight path of the UAV is based on a result of the comparison of the first value to the second value (e.g., scheduling a refueling or return home, when the result of the comparison of the first value to the second value fulfills a criterion).

Example 9 is the method of one of the examples 1 to 8, wherein a chronological order, in which the UAV operates (e.g. flying between the local environments of each sensor of the at least one stationary sensor) is scheduled based on a remaining operating range of the UAV 202 and/or based on a database; wherein the database includes at least one information of the following information of the at least one sensor: a position; a priority of maintenance; a priority of inspection; a level of reliability; an inspection request; a type of sensor; and/or geographic coordinates (e.g., in positional proximity to the at least one stationary sensor).

Example 10 is the method of one of the examples 1 to 9, wherein the first sensing and the second sensing provide environmental information (e.g. of the same type); wherein the environmental information includes at least one of the following types of environmental information: temperature information, radiation information (e.g., of particle and/or electromagnetic radiation, e.g., radio and/or light), humidity information, luminance information, wind speed information, pollution information (e.g., of air and/or water pollution); chemical composition information; pressure information; bionic information; electricity information; audio information; image information, image information and/or video information.

Example 11 is the method of one of the examples 1 to 10, wherein the comparison is performed by a stationary processor (e.g., disposed outside the local environment of the at least one stationary sensor).

Example 12 is the method of one of the examples 1 to 11, wherein classifying the at least one stationary sensor further indicates a maintenance request (e.g., if a second class is assigned to the at least one stationary sensor).

Example 13 is the method of one of the examples 1 to 12, wherein the UAV repeatedly (e.g. periodically) performs the second sensing or repeatedly approaches the at least one stationary sensor (e.g. approaching one or more than one other stationary sensor in between).

Example 14 is the method of one of the examples 1 to 13, further including: receiving a maintenance confirmation for the at least one stationary sensor; and re-classifying the at least one stationary sensor in response to receiving the maintenance confirmation.

Example 15 is the method of one of the examples 1 to 12, wherein the classifying indicates a level of reliability of the at least one stationary sensor.

Example 16 is the method of one of the examples 1 to 15, further including: the at least one stationary sensor transmitting the result of the first sensing (also referred as to first result); and the UAV transmitting the result of the second sensing (also referred as to second result); wherein a communication connection for transmitting the first result and transmitting the second result differs in at least one of the following: a communication network, a transmission access technology, a transmission medium, a security level, and/or an encryption protocol.

Example 17 is the method of example 16, wherein the second result is transmitted via a mobile radio access technology or wireless access technology.

Example 18 is the method of one of the examples 16 or 17, wherein the first result is transmitted via a wired or short-range access technology and/or stored by the unmanned aerial vehicle.

Example 19 is the method of one of the examples 1 to 18, further including the unmanned aerial vehicle encrypting the second result; and optionally the unmanned aerial vehicle storing and/or transmitting the encrypted second result (e.g., to the one or more than one stationary processor and/or via a wired access technology or a short-range access technology).

Example 20 is the method of one of the examples 1 to 19, further including: the UAV storing the (e.g., encrypted) second result; the UAV transmitting the (e.g., encrypted) second result via a short-range radio access technology and/or a wired access technology.

Example 21 is the method of one of the examples 1 to 20, the UAV storing the (e.g., encrypted) second result; wherein the second result includes a time stamp representing a time and/or duration of the second sensing.

Example 22a is the method example 21, wherein the comparison is based on the time stamp.

Example 22b is the method example 21 or 22a, wherein the first result represents a plurality of environmental information, each environmental information correlating to a time of the first sensing; and comparing the first result and second result based on the time stamp.

Example 23 is the method of one of the examples 1 to 22b, further including: the at least one stationary sensor transmitting the first result via a long range and/or cellular radio access technology.

Example 24 is the method of one of the examples 1 to 23, wherein the first result and/or the second result include context information; and wherein the result of the comparing is based at least on the context information.

Example 25 is the method of example 24, wherein comparing the first result and the second result includes comparing and/or matching the context information of the first result and the context information of the second result.

Example 26 is the method of one of the examples 24 or 25, wherein the context information includes at least one of the following types of context information: at least one time stamp and/or at least one geotag.

Example 27 is the method of one of the examples 1 to 26, wherein the result of the comparison represents a difference between the first result and the second result (e.g., each representing environmental information).

Example 28 is the method of one of the examples 1 to 27, wherein the classifying of the at least one stationary sensor includes assigning a first class to the at least one stationary sensor when the result of the comparing fulfils a criterion, and otherwise assigning a second class to the at least one stationary sensor; wherein the first class and the second class differ in an indicated level of reliability, e.g., the first class representing a higher level of reliability than the second class.

Example 29 is the method of one of the examples 1 to 28, further including: a network interconnected system providing one or more network based services, the network interconnected system including one or more processors, one or more memories and the at least one stationary sensor; wherein the network interconnected system processes data received from the at least one stationary sensor based on the classification of the at least one stationary sensor.

Example 30 is the method of example 29, wherein the network interconnected system includes a plurality of NCD.

Example 31 is the method of example 29 or 30, wherein the network interconnected system includes a cyber-physical system.

Example 32 is the method of one of the examples 29 to 31, further including: the network interconnected system ignoring the at least one stationary sensor based in the result of the classification (e.g., if the second class is assigned to the at least one stationary sensor).

Example 33 is a circuit, including: a first communication interface configured to receive first sensor data from a stationary sensor (e.g., the first sensor data representing environment information of a local environment of first sensor); a second communication interface configured to receive second sensor data from an UAV (e.g., the second sensor data representing environment information of at least a portion of the local environment of the at least one stationary sensor); one or a plurality of processors configured to compare the first sensor data and the second sensor data and to classify the at least one stationary sensor based on a result of the comparison; wherein the one or the plurality of processors are optionally further configured to perform the method of one of the examples 1 to 32.

Example 34 is the circuit of example 33, wherein at least one processor of the one or the plurality of processors is configured to instruct the at least one stationary sensor to provide the first sensor data.

Example 35 is the circuit of example 33 or 34, wherein at least one processor of the one or a plurality of processors is configured to instruct the UAV to provide the second sensor data.

Example 36 is a circuit. The circuit may include a first communication interface configured to receive first sensor data from a stationary sensor. The first sensor data include a result of a first sensing of a local environment of the stationary sensor performed by the stationary sensor. The circuit may further include a second communication interface configured to receive second sensor data from an unmanned aerial vehicle. The second sensor data include a result of a second sensing of at least a portion of the local environment of the stationary sensor performed by a sensor of the unmanned aerial vehicle. The circuit may further include one or a plurality of processors configured to compare the first sensor data and the second sensor data and to classify the at least one stationary sensor based on a result of the comparison.

Example 37 is the circuit of example 36, wherein at least one processor of the one or the plurality of processors is configured to instruct the at least one stationary sensor to provide the first sensor data.

Example 38 is the circuit of any one of examples 36 or 37, wherein at least one processor of the one or a plurality of processors is configured to instruct the unmanned aerial vehicle to provide the second sensor data.

Example 39 is the circuit of any one of examples 36 to 38, wherein at least one processor of the one or a plurality of processors is configured to: receive a result of a first sensing of the local environment of at least one stationary sensor, receive a result of a second sensing of at least a portion of the local environment of the at least one stationary sensor, compare the result of the first sensing and the result of the second sensing, classify the at least one stationary sensor based on a result of the comparison.

Example 40 is the circuit of any one of examples 36 to 39, wherein at least one processor of the one or a plurality of processors is configured to: receive navigation information from the unmanned aerial vehicle, the navigation information representing a position of the at least one stationary sensor or a flight path thereto; and instruct the unmanned aerial vehicle to fly in accordance with the navigation information.

Example 41 is the circuit of any one of examples 36 to 40, wherein at least one processor of the one or a plurality of processors is configured to generate an inspection request triggering the unmanned aerial vehicle performing the second sensing.

Example 42 is the circuit of any one of examples 36 to 41, wherein the first sensing and the second sensing provide environmental information; wherein the environmental information includes at least one of the following types of environmental information: temperature information, radiation information, humidity information, luminance information, wind speed information, pollution information, chemical composition information, pressure information, bionic information, electricity information, audio information, image information, and/or video information.

Example 43 is the circuit of any one of examples 36 to 42, wherein the classifying indicates a level of reliability of the at least one stationary sensor.

Example 44 is a system, including: an UAV including a sensor (also referred as to onboard sensor); at least one stationary sensor configured to perform a first sensing of its local environment; at least one circuit configured to compare a first result of the first sensing and a second result of the second sensing, and to classify the at least one stationary sensor based on a result of the comparing; wherein the circuit is optionally further configured to perform the method of one of the examples 1 to 32.

Example 45 is the system of example 44, the at least one circuit including: a first circuit and/or a second circuit; wherein the first circuit is configured to instruct the at least one stationary sensor to perform a first sensing of its local environment; wherein the first circuit and/or the second circuit is configured to instruct the UAV to perform (e.g., via the onboard sensor) a second sensing of at least a portion of the local environment of the at least one stationary sensor.

Example 46 is a system. The system may include at least one stationary sensor configured to perform a first sensing of its local environment, an unmanned aerial vehicle comprising a sensor, a circuit configured to instruct the at least one stationary sensor to perform the first sensing and to instruct the unmanned aerial vehicle to perform a second sensing of at least a portion of the local environment of the at least one stationary sensor. The or a further circuit may be configured to compare a first result of the first sensing and a second result of the second sensing, and to classify the at least one stationary sensor based on a result of the comparison.

Example 47 is the system of example 46, wherein the circuit or the further circuit is configured to instruct the unmanned aerial vehicle to fly into the local environment of the at least one stationary sensor.

Example 48 is the system of any one of examples 46 or 47, wherein the circuit or the further circuit is configured to: receive navigation information from the unmanned aerial vehicle, the navigation information representing a position of the at least one stationary sensor or a flight path thereto; and instruct the unmanned aerial vehicle to fly in accordance with the navigation information.

Example 49 is the system of any one of examples 46 to 48, wherein the circuit or the further circuit is configured to generate an inspection request triggering the unmanned aerial vehicle performing the second sensing.

Example 50 is the system of any one of examples 46 to 49, wherein at least one of the at least one stationary sensor or the sensor of the unmanned aerial vehicle is configured to provide environmental information as the result of the first sensing or as the result of the second sensing; wherein the environmental information comprises at least one of the following types of environmental information: temperature information, radiation information, humidity information, luminance information, wind speed information, pollution information, chemical composition information, pressure information, bionic information, electricity information, audio information, image information, and/or video information.

Example 51 is the system of any one of examples 46 to 50, wherein the at least one stationary sensor includes a plurality of stationary sensors, of which each is classified.

Example 52 is the system of any one of examples 46 to 51, wherein the at least one stationary sensor is configured to perform the comparison.

Example 53 is a computer-readable medium storing instructions, when executed by a processor, implementing a method including: receiving first sensor data from a stationary sensor, wherein the first sensor data include a result of a first sensing of a local environment of the stationary sensor performed by the stationary sensor; receiving second sensor data from an unmanned aerial vehicle, wherein the second sensor data include a result of a second sensing of at least a portion of the local environment of the stationary sensor performed by a sensor of the unmanned aerial vehicle; comparing the first sensor data and the second sensor data; and classifying the at least one stationary sensor based on a result of the comparison.

Example 54 is the computer-readable medium of example 53, wherein the instructions include instructions to the at least one stationary sensor to provide the first sensor data.

Example 55 is the computer-readable medium of any one of examples 53 or 54, wherein the instructions include instructions to the unmanned aerial vehicle to provide the second sensor data.

Example 56 is the computer-readable medium of any one of examples 53 to 55, wherein the instructions comprise instructions to: receive navigation information from the unmanned aerial vehicle, the navigation information representing a position of the at least one stationary sensor or a flight path thereto; and instruct the unmanned aerial vehicle to fly in accordance with the navigation information.

Example 57 is the computer-readable medium of any one of examples 53 to 56, wherein at least one processor of the one or a plurality of processors is configured to generate an inspection request triggering the unmanned aerial vehicle performing the second sensing.

Example 58 is a means for environmental sensing (e.g., a circuit), including: a first communication means configured for receiving first sensor data from a stationary sensing means; a second communication means configured for receiving second sensor data from an unmanned aerial vehicle; one or a plurality of processing means configured for comparing the first sensor data and the second sensor data and for classifying the at least one stationary sensing means based on a result of the comparison.

Example 59 is the means of example 58, wherein at least one processing means of the one or the plurality of processing means is configured for instructing the at least one stationary sensing means to provide the first sensor data.

Example 60 is the means of example 58 or 59, wherein at least one processing means of the one or a plurality of processing means is configured for instructing the unmanned aerial vehicle to provide the second sensor data.

Example 61 is a means for environmental sensing (e.g., a system), including: an unmanned aerial vehicle including a sensing means; at least one stationary sensing means configured for performing a first sensing of its local environment; at least one circuit configured for comparing a first result of the first sensing and a second result of the second sensing, and for classifying the at least one stationary sensing means based on a result of the comparing.

Example 62 is the means of example 61, the at least one circuit including: a first circuit and/or a second circuit; wherein the first circuit is configured for instructing the at least one stationary sensing means to perform a first sensing of its local environment; wherein the first circuit and/or the second circuit is configured for instructing the unmanned aerial vehicle to perform a second sensing of at least a portion of the local environment of the at least one stationary sensing means.

Example 63 is a (e.g., non-transient) computer readable medium including code segments configured to perform the method of one of the examples 1 to 32 when executed by one or more than one processor.

Example 64 is the one of the examples 1 to 63, the method, code segments, system and/or circuit may be for environmental sensing.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit, comprising:
a first communication interface configured to receive first sensor data from a first sensor,
wherein the first sensor data comprises a result of a first sensing of an environmental condition of the first sensor performed by the first sensor at a first location and at a first time;
a second communication interface configured to receive second sensor data from an autonomous vehicle,
wherein the second sensor data comprises a result of a second sensing of the environmental condition at the first location performed by a sensor of the autonomous vehicle at a second time that is different from the first time and at a second location that is physically separate from the first location;
one or more processors configured to
determine a difference between the first sensor data and the second sensor data, and
generate an inspection report for the first sensor based on the difference, wherein if the difference exceeds a threshold value, the inspection report comprises an indication that the first sensor is malfunctioning,
wherein the processor is configured to adjust the threshold value based on a chronological difference between the first time of the first sensing and the second time of the second sensing.

2. The circuit of claim 1, wherein the autonomous vehicle comprises an automobile.

3. The circuit of claim 1, wherein the inspection report further comprises at least one of an instruction to calibrate the first sensor, an instruction to replace the first sensor, an instruction to repair the first sensor, an instruction to discard the first sensor data, or an instruction to re-inspect the first sensor.

4. The circuit of claim 1, wherein a processor of the one or more processors is configured to:
receive navigation information for the autonomous vehicle, the navigation information representing a position of the first sensor or a movement path from a location of the autonomous vehicle to the position of the first sensor, and
generate an instruction for the autonomous vehicle to move in accordance with the navigation information.

5. The circuit of claim 1, wherein a processor of the one or more processors is configured to generate an inspection request adapted to trigger the autonomous vehicle to perform the second sensing in response to the performance of the first sensing by the first sensor.

6. The circuit of claim 1, wherein the environmental condition comprises at least one of audio information, image information, or video information.

7. The circuit of claim 1, wherein the first sensor data is encrypted with a first encryption protocol and the second sensor data is encrypted with a second encryption protocol, wherein the first encryption protocol is different from the second encryption protocol.

8. The circuit of claim 1, wherein the autonomous vehicle comprises a robot.

9. The circuit of claim 1, wherein the processor configured to adjust the threshold value based on the chronological difference comprises the processor configured to increase the threshold value with an increase in the chronological difference and to decrease the threshold value with a decrease in the chronological difference.

10. A system comprising:
an autonomous vehicle comprising a first sensor configured to sense as first sensor data an environmental condition of a sensing location associated with a second sensor, wherein the first sensor is physically separate from the sensing location by a distance;
a communications interface configured to receive the first sensor data and configured to receive second sensor data associated with a second sensing by the second sensor of the environmental condition at the sensing location;
a processor configured to determine a difference between the first sensor data and the second sensor data and
generate an inspection report for the second sensor, wherein the inspection report comprises, if the difference exceeds a threshold value, an indication that the first sensor is malfunctioning and an instruction to discard the second sensor data,
wherein the processor is configured to adjust the threshold value based on the distance.

11. The system of claim 10, wherein the communications interface is further configured to receive the sensing location as part of an inspection routine, wherein the inspection routine comprises timing information associated with a time at which the first sensor is configured to sense the environmental condition of the sensing location.

12. The system of claim 11, wherein the threshold value is further based on a chronological difference between the time and a second time associated with the second sensing.

13. The system of claim 12, wherein the chronological difference is less than about 0.3 minutes.

14. The system of claim 11, wherein the processor is further configured to calculate a movement plan for the autonomous vehicle to carry out the inspection routine.

15. The system of claim 14, wherein the movement plan comprises at least one of a movement velocity, a movement acceleration, a movement path, or a movement direction for the autonomous vehicle.

16. The system of claim 14, wherein the inspection routine comprises a plurality of additional sensing locations, wherein each additional sensing location of the plurality of additional sensing locations is associated with an additional sensor, and wherein the movement plan comprises a chronological order in which the autonomous vehicle senses the environmental condition of the sensing location and at each additional sensing location of the plurality of additional sensing locations.

17. The system of claim 16, wherein the chronological order is based on at least one of a sensor priority, a geographical location priority, an assigned sensor group, or a type of sensor associated with each of the second sensor and the plurality of additional sensors.

18. The system of claim 17, wherein the chronological order is based on the sensor priority, wherein the sensor priority comprises a period of time since a previous sensing of the environmental condition by the first sensor at the sensing location.

19. The system of claim 10, wherein the distance is less than about 50 meters.

20. The system of claim 10, wherein the processor configured to adjust the threshold value based on the distance comprises the processor configured to increase the threshold value with an increase in the distance and to decrease the threshold value with a decrease in the distance.

* * * * *